Patented Feb. 14, 1928.

1,659,198

UNITED STATES PATENT OFFICE.

ROBERT GRIESSBACH, OF LUDWIGSHAFEN-ON-THE-RHINE, AND KURT RÖHRE, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF AMMONIUM PHOSPHATE.

No Drawing. Application filed March 17, 1926, Serial No. 95,433, and in Germany March 23, 1925.

It is known that ammonium phosphate can be produced from phosphoric anhydride which is obtained by the combustion of phosphorus by mixing the combustion gases containing phosphoric anhydride with ammonia or with gases containing ammonia and precipitating the ammonium phosphate which has been formed as a fine dust. Though solid compounds of phosphoric acid and ammonia can be produced according to this process, it is almost impossible to thereby produce uniform products. A further disadvantage according to the said process exists in the fact that when dilute ammoniacal gases are added, as for example the coal distillation gases, the phosphoric anhydride vapors are strongly diluted and consequently the precipitation of the ammonium phosphate becomes very difficult. It has also been proposed to pass the gases containing phosphoric anhydride through water or dilute phosphoric acid, and by this means a rather concentrated phosphoric acid is obtained which can be transformed into ammonium phosphate in the usual manner.

We have now found that phosphoric anhydride is satisfactorily absorbed from gases containing it by means of ammonium phosphate solutions. For example, a mono-ammonium phosphate solution saturated at room temperature may be used for feeding the absorption towers. By adding a suitable amount of ammonia during absorption, a proportion of 1 molecule of phosphoric acid to 1 molecule of ammonia is approximately maintained. The solution which becomes very hot takes up an increasing percentage of phosphoric acid or ammonium phosphate. The amount of ammonia required may be supplied to the gases prior to absorption or introduced into the absorption towers or added to the resulting solution. The latter is enriched in ammonium phosphate until a solution is obtained which in the heat is nearly saturated. On cooling to room temperature the ammonium phosphate separates therefrom and is withdrawn and the mother liquor is used over again for the absorption.

Ammonium phosphate solutions containing more ammonia than indicated above may also be used for absorbing the phosphoric anhydride vapors. The proportion of 3 molecules of ammonia and 2 molecules of phosphoric acid should however preferably not be exceeded and the rest of the ammonia required to obtain di-ammonium phosphate should be added to the cooled solution as gaseous ammonia only after absorption. According to this method of working, pure di-ammonium phosphate is directly obtained in the solid state. If necessary, the solution may be freed from any suspended impurities as for example iron or alumina compounds and so forth, prior to cooling.

As part of the water of the solution is consumed or evaporated in the course of the reaction the ammonia may be partly added in the form of ammonia water.

The process herein described not only makes it possible to produce directly pure crystallized mono- or di-ammonium phosphate, but also possesses the advantage of a much better absorption of the phosphoric anhydride from the dilute gases which is due to the employment of ammonium phosphate solutions instead of water or dilute phosphoric acid. For example, under equal conditions from gases containing phosphoric anhydride 10 parts were absorbed by water, while 22 parts of phosphoric anhydride were absorbed by an ammonium phosphate solution containing 66.3 grammes of ammonia and 254 grammes of phosphoric acid ($H_3PO_4$) in a litre.

We claim:

1. The process of manufacturing ammonium phosphates from gases containing phosphoric anhydride which consists in absorbing the phosphoric anhydride by means of an ammonium phosphate solution and adding ammonia required for the desired ammonium phosphoric acid compound.

2. The process of manufacturing ammonium phosphates from gases containing phosphoric anhydride which consists in absorbing phosphoric anhydride from the gases by means of an ammonium phosphate solution having between 1 and 2 of the three acid valences combined with ammonia, adding ammonia to the hot solution after absorption until a solution of di-ammonium phosphate is obtained, separating the latter and using the liquor again for absorption.

In testimony whereof we have hereunto set our hands.

ROBERT GRIESSBACH.
KURT RÖHRE.